United States Patent
Kelly (10) Patent No.: US 9,310,238 B2
(45) Date of Patent: Apr. 12, 2016

(54) PRE-MEASURED DISPENSING LID

(76) Inventor: Joseph Kelly, San Francisco, CA (US)

(*) Notice: Subject to any disclaimer, the term of this patent is extended or adjusted under 35 U.S.C. 154(b) by 0 days.

(21) Appl. No.: 13/411,084

(22) Filed: Mar. 2, 2012

(65) Prior Publication Data

US 2013/0228594 A1 Sep. 5, 2013

(51) Int. Cl.
*G01F 11/28* (2006.01)
*G01F 11/26* (2006.01)

(52) U.S. Cl.
CPC ................................ *G01F 11/263* (2013.01)

(58) Field of Classification Search
CPC ............................. G01F 11/263; G01F 11/24
USPC .......................... 222/444, 450, 452, 454, 456
See application file for complete search history.

(56) References Cited

U.S. PATENT DOCUMENTS

| | | | | |
|---|---|---|---|---|
| 2,877,937 A * | 3/1959 | Weir | | 222/452 |
| 2,904,230 A * | 9/1959 | Worth | | 222/452 |
| 3,207,371 A * | 9/1965 | Stone | | 222/48 |
| 4,174,058 A * | 11/1979 | Bassignani | | 222/438 |
| 4,961,521 A * | 10/1990 | Eckman | | 222/142.5 |
| 5,588,563 A * | 12/1996 | Liu | | 222/158 |
| 5,772,086 A * | 6/1998 | Krafft | | 222/438 |
| 6,601,734 B1 * | 8/2003 | Smith | | 222/142.9 |
| 7,748,579 B1 * | 7/2010 | Shin | | 222/450 |
| 2003/0209571 A1 * | 11/2003 | Smith | | 222/450 |
| 2005/0279748 A1 * | 12/2005 | Kosmyna | | 220/495.02 |
| 2007/0113920 A1 * | 5/2007 | Bronner | | 141/112 |
| 2008/0044314 A1 * | 2/2008 | McIntyre et al. | | 422/102 |
| 2009/0001104 A1 * | 1/2009 | Ranney | | 222/438 |

OTHER PUBLICATIONS

Matt DeJohn et al., 2D to 3D Conversion, Stereoscopic 3D, Mar. 20, 2010, pp. 414-427, chapter 5, Focal Press, Oxford, United Kingdom.

* cited by examiner

*Primary Examiner* — Kevin P Shaver
*Assistant Examiner* — Jeremy W Carroll
(74) *Attorney, Agent, or Firm* — Novak Druce Connolly Bove + Quigg LLP (57) ABSTRACT

The present technology allows for substances contained within containers to be transferred to a measuring cup so as to allow for a clean, efficient, and accurate transfer of a substance from a container in to a measuring cup. The measuring cup can be reversibly attached to the lid such that when the container is inverted, the measuring cup can fill with the substance.

12 Claims, 7 Drawing Sheets

FIGURE 4
Scale:1" = 1"

FIGURE 5
Scale: 1" = 1"

PRE-MEASURED DISPENSING LID

BACKGROUND

1. Technical Field

The present disclosure relates to a lid and more particularly to a lid having a detachable measuring cup attached thereto.

2. Introduction

Measuring cups are typically separate from containers. Typically, when using a measuring cup, a user will have to dip the measuring cup into the substance they are trying to measure in an attempt to get the correct amount of substance into their measuring cup. In other situations, the user will have to pour the substance into their measuring cup. In both of these situations, users will cause a mess, either in dipping the measuring cup into the substance and getting the substance on their hands, or in pouring the substance into their measuring cup and getting the substance over a counter. Both of these situations also makes it difficult to get the correct amount of substance into the measuring cup, either because the measuring cup is too big for the container, the substance can't be poured easily, etc. Thus there is a need for an apparatus that allows for a clean, efficient, and accurate transfer of a substance from a container into a measuring cup.

SUMMARY

The present technology allows for substances contained within containers to be transferred to a measuring cup so as to allow for a clean, efficient, and accurate transfer of a substance from a container into a measuring cup.

In some embodiments a measuring cup can be provided within a container having a substance to be dispensed in measured amounts. The measuring cup can be attached to the lid of the container and the container can be inverted to allow the appropriate amount of the substance to fill the measuring cup.

The lid of the container can include a top portion and a bottom portion. The top portion and the bottom portion can be connected to each other, and at the same time allow for movement of one or the other of the portions relative to its counterpart portion.

The top portion can have an opening formed within it, and that is configured to receive a measuring cup. The measuring cup can be reversibly attached to the top portion. For example, the opening formed in the top portion of the lid can have threads, while the measuring cup can have a complimentary set of threads to allow the measuring cup to be threaded on to the top portion of the lid, conventionally in the clockwise direction. The measuring cup can also be removed from the top portion by threading the measuring cup, conventionally in the counter clockwise direction. In another example, the measuring cup could snap into place, in or about the opening. Other mechanisms of reversible attachment are well known within the art.

As addressed above, the top portion and the bottom portion are configured to allow for movement about each other. In some embodiments the top portion can rotate about a co-centric axis shared with the bottom portion. The top portion can rotate to bring the opening in the top portion into alignment with an opening formed in the bottom portion. When the openings in the top portion and the bottom portion are aligned, a passage can be created such that the substance within the container can be poured out of the container into the measuring cup attached to the top portion. When the openings in the top portion and the bottom portion are not aligned, the container is sealed and the substance cannot be poured out of the container. Likewise, if any substance has been poured into the measuring cup, it cannot flow back into the container.

In embodiments wherein a top portion of the lid is movable with respect to the bottom portion of the lid, such as rotationally as addressed above, or such as by sliding and other embodiments addressed herein, it can be useful to include features on the portions of the lid that can be used to limit the amount of movement to a determined amount. For example, the top piece can include a bumper which can interface with the bottom piece or the container itself to limit the movement of the top piece so that at one extreme of movement, the openings will be properly aligned, and to limit movement in the other extreme so that the channels do not overlap at all and the container can be sealed. In some embodiments of the bumper, it can be formed on the underside of the top piece. In some aspects, the bumper can interface with stops on the top of the bottom piece.

In some operational embodiments, a consumer can purchase a container having the pre-measured dispensing lid disclosed herein. Often the measuring cup will be provided within the container for ease of shipping the container. In some embodiments, the pre-measured dispensing lid can be purchased separate from the container. When the consumer is ready to dispense the product, the consumer can attached the measuring cup to the lid, move the measuring cup into alignment with an opening in the container, and invert the container so that the substance pours out of the container and into the measuring cup.

Once the measuring cup is full, while the container is still inverted, the consumer can move the measuring cup out of alignment with the opening (which also moves a portion of the lid over the opening thereby sealing the container), and detach the measuring cup from the lid. The substance in the measuring cup can then be used for its intended purpose.

When used in this manner, the pre-measured dispensing lid allows for a clean and easy transfer of a substance into a measuring cup without any (or very minimal) loss of substance. Furthermore, the measuring cup can be stored while still attached to the lid rather than put back into the substance, which reduces the risk of contamination.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following descriptions, drawings, and appended claims, or can be learned by the practice of the principles set forth herein.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1A:
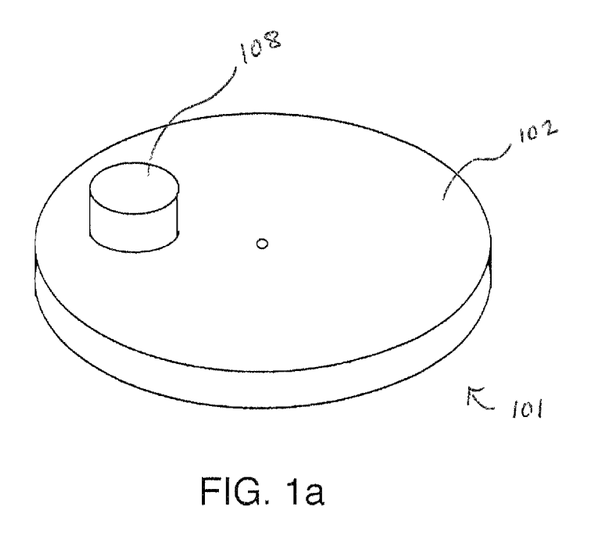
FIG. 1a illustrates an embodiment of the pre-measured dispensing lid.
Figure 1B:
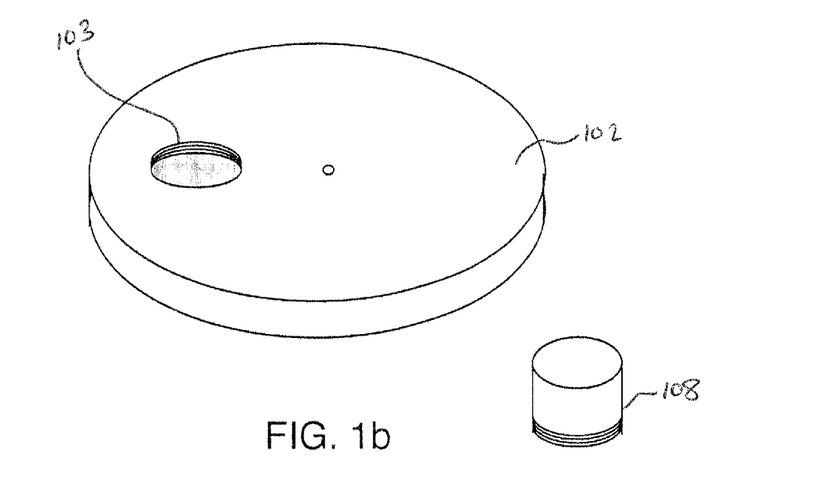
FIG. 1b illustrates a top surface of a top portion of an embodiment of the pre-measured dispensing lid.

FIGS. 1a-1d illustrate the components of an embodiment of the apparatus. As illustrated in FIG. 1a, the apparatus can include a pre-measured lid 101. As illustrated in FIG. 1b, which shows a top view of a top portion of the pre-measured lid 101, and FIG. 1c, which shows a bottom view of the top portion of the pre-measured lid 101, the pre-measured lid 101 can include a threaded hole 103 for receiving a measuring cup 108, and a bumper 104.

Figure 1C:
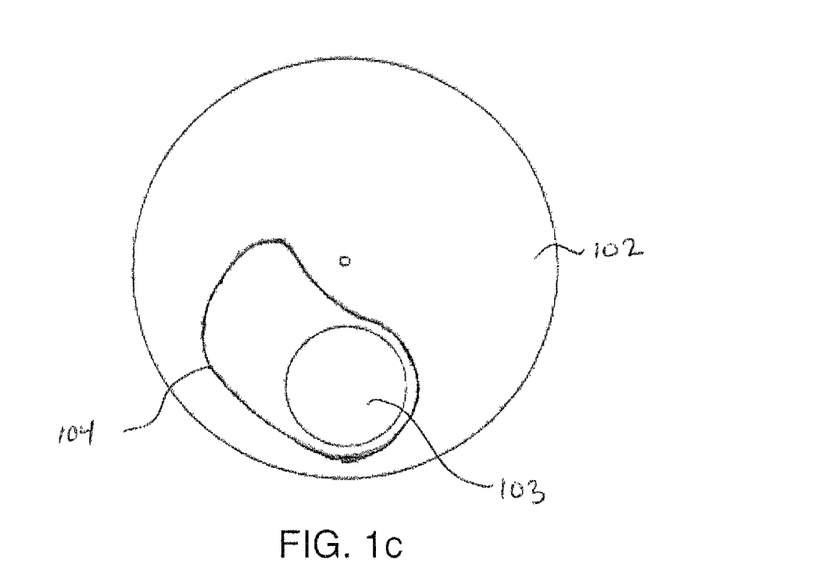
FIG. 1c illustrates a bottom surface of a top portion of an embodiment of the pre-measured dispensing lid.
Figure 1D:
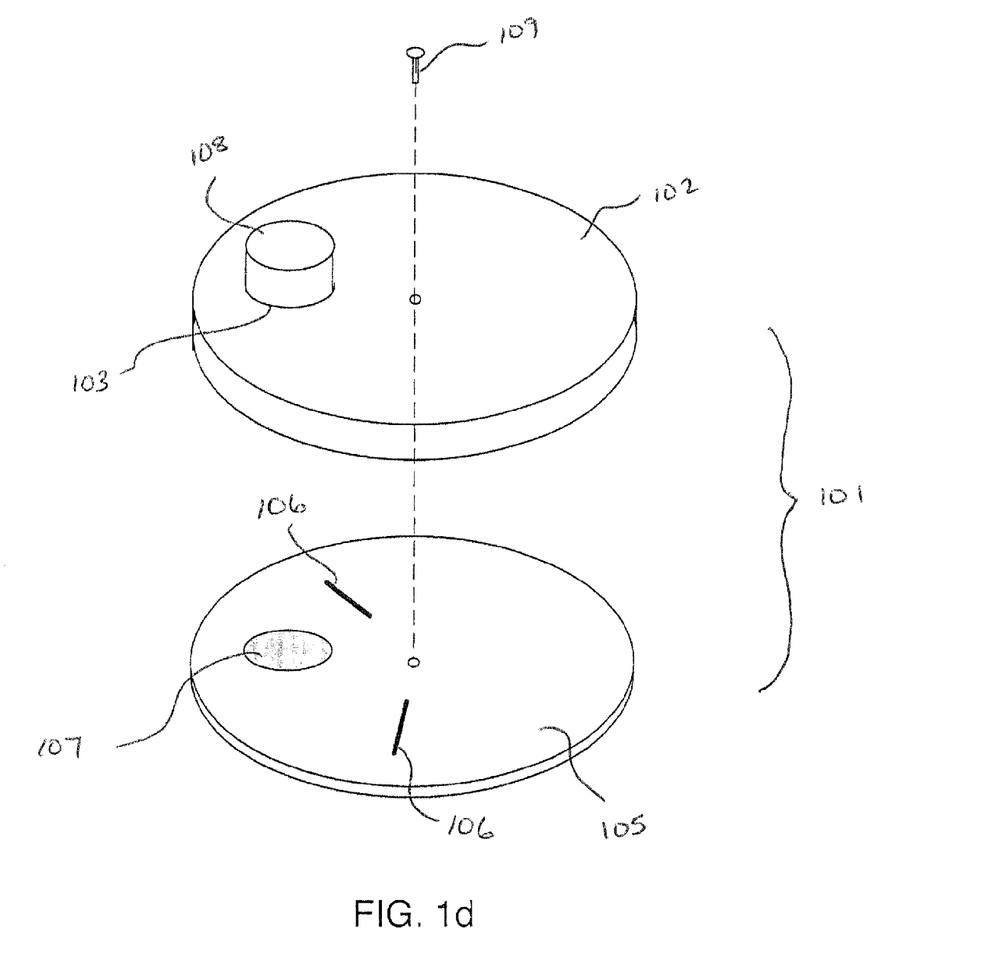
FIG. 1d illustrates components of an embodiment of the pre-measured dispensing lid.

As illustrated in FIG. 1d, the top piece 102 joins with a bottom piece 105, which can include a rotation stop 106, and an opening 107.

The pre-measured lid 101 is configured to be attached to a container that contains a substance. The mechanism and method of attachment of the lid to the container can be any mechanism and method known to those skilled in the art. However, in some embodiments, the method and mechanism of attachment should allow for the lid to be repeatedly attached and detached from the container.

As illustrated in FIG. 1d, the top piece 102 can be a circular object that can have the same diameter as the bottom piece 105. In some embodiments, the top piece 102 can be approximately 12 inches in diameter and composed of plastic, and the bottom piece 105 can also be approximately 12 inches in diameter and also composed of plastic. Those skilled in the art will appreciate that the top piece 102 and bottom piece 105 can be 6 inches, 10 inches, or any other diameter. Those skilled in the art will also appreciate that the diameter of the top piece 102 and the bottom piece 105 do not need to be equal. Those skilled in the art will also appreciate that the top piece 102 and bottom piece 105 can be composed of wood, iron, alloy metal, or other substances suitable for use in the present technology in addition to the plastic disclosed above. The top piece 102 and bottom piece 105 can also each be 1 inch in thickness. Those skilled in the art can further appreciate that the top piece 102 and bottom piece 105 can be many other thicknesses, and the top and bottom pieces do not need to be the same thickness.

The top piece 102 can contain a threaded hole 103. The threaded hole 103 can contain ridges within the threaded hole 103 that can allow for a measuring cup 108 that contains threads at the top of the measuring cup 108 to be attached to a threaded hole 103. In one example, the threaded hole 103 can be 2 inches in diameter, where as the measuring cup 108 can also be 2 inches in diameter so that it can be attached to the threaded hole 103 by a user. Those skilled in the art will appreciate that the threaded hole can be any other diameter. Those skilled in the art will also appreciate that the threaded hole 103 can be located in various places on the top piece 102, as long as the threaded hole 103 on the top piece 102 and the opening 107 on the bottom piece 105 can be aligned, as will be addressed below.

The bottom side of the top piece 102 can contain a bumper 104. The bumper 104 can extend outwards from the bottom side of the top piece 102 by a distance that can allow it to connect to the rotation stop 106 on the top side of the bottom piece 105, as the top piece 102 rotates about the bottom piece 105, as will be addressed further below. The bumper 104 can be located a certain distance from the threaded hole 103 on the bottom side of the top piece 102. When the top piece 102 is connected to the bottom piece 105 via a top connector 109, the bumper 104 on the bottom side of the top piece 102 can interface with the rotation stop 106 on the top side of the bottom piece 105, thus impeding the rotation of the top piece 102 about the bottom piece 105. Those skilled in the art will also appreciate that the bumper 104 can be composed of plastic, wood, iron, alloy metal or other substances suitable for use in the present technology. Those skilled in the art will also appreciate that the bumper 104 can extend outwards by various distances including 1, 3, 5 centimeters, etc., as long as the bumper 104 on the bottom side of the top piece 102 can connect with the rotation stop 106 on the top side of the bottom piece 105, thus impeding the rotation of the top piece 102 about the bottom piece 105.

The bottom piece 105 can contain an opening 107. Those skilled in the art appreciate that the opening 107 can be 3, 4, 5 inches, or any other diameter. The opening 107 can be located in various places on the bottom piece 105, as long as the threaded hole 103 on the top piece 102 and the opening 107 on the bottom piece 105 can be aligned. The top side of the bottom piece 105 can contain a rotation stop 106. The rotation stop 106 can extend outwards from the top side of the bottom piece 105 by a distance that allows it to interface with the bumper 104 on the bottom side of the top piece 102. The rotation stop 106 can be located a certain distance from the opening 107 on the top side of the bottom piece 105. When the bottom piece 105 is connected to the top piece 102 via a top connector 109, the rotation stop 106 on the top side of the bottom piece 105 can interface with the bumper 104 on the bottom side of the top piece 102, thus impeding the rotation of the top piece 102 about the bottom piece 105. The rotation stop 106 can be composed of plastic, wood, iron, alloy metal or other substances suitable for use with the present technology. Those skilled in the art will also appreciate that the rotation stop 106 can extend outwards by other distances including 1, 3, 5 centimeters, etc., as long as the bumper 104 on the bottom side of the top piece 102 can connect with the rotation stop 106 on the top side of the bottom piece 105, thus impeding the rotation of the top piece 102 about the bottom piece 105.

The size of the opening 107 on the bottom piece 105 can be modified depending on the type of substance that will be entering the measuring cup 108. For example, the opening 107 can be reduced to 1 millimeter for a liquid substance, or 5 millimeters for a solid substance such as salt.

As illustrated in FIG. 1d, the top portion 102 can connect to a bottom portion 105. The top portion 102 can connect to the bottom portion 105 by using a top connector 109. A top connector 109 can include a screw, clasp, threads, etc. that can be used to connect portions together. As an example, a revolute joint can be used to connect the op portion 102 to the bottom portion 105. After the top portion 102 and the bottom portion 105 are connected with the top connector 109, the top portion 102 can rotate about the bottom portion 105 in either a clockwise or counterclockwise rotation. As described above, the top side of the bottom portion 105 can contain rotation stops 106. The bottom side of the top portion 102 can also contain a bumper 104 that, when interfacing to the rotation stops 106 on the bottom portion 105, impede the rotation of the top portion 102 about the bottom portion 105.

In some embodiments of the present technology, the top portion 102 and the bottom portion 105 can connect together via the use of snaps that can allow the top portion 102 and bottom portion 105 to snap together. The top portion 102 and the bottom portion 105 can be molded to enable them to snap together.

A measuring cup 108 can be attached to the top side of top portion 102 via the threaded hole 103. The measuring cup 108 can be attached to the top portion 102 using threads located on the measuring cup 108, and threads located within the threaded hole 103. A user can screw the measuring cup 108 in to the threaded hole 103 on the top portion 102. This way of connecting the measuring cup 108 to the top portion 102 is not meant to be exhaustive of the only way to connect the measuring cup 108 to the top portion 102, as the measuring cup 108 can be connected to the top portion 102 in other ways such as via a snap-function or with screws. The measuring cup 108 can be made of plastic, wood, iron, or alloy steel, or via any other material known to those skilled in the art.

In some embodiments, the size of the measuring cup 108 that can be attached to the top portion 102 can be changed to allow for different sizes of measuring cups 108 to be attached to the top portion 102. For example, a measuring cup for 1 ounce can be attached to the lid, and also a measuring cup for 5 ounces can be attached to the same lid.

In some embodiments, the measuring cup 108 can be made of see-through material such as plastic so that the user can visualize when the measuring cup is full. The measuring cup 108 can also be made of other materials that are not see-through, but that also allow for a user to determine when the measuring cup 108 is full.

As illustrated in FIG. 1d, the top portion 102, with the measuring lid 108 attached to it, with the bottom portion 105 attached to the top portion 102 via the top connector 109, can comprise the pre-measured lid 101 apparatus. The pre-measured lid 101 apparatus can then be attached to a container that contains a substance within that container. The substance can include flour, sugar, tea, weight lifting protein, or various other substances that go in the container. The pre-measured lid 101 apparatus can be attached to a container in numerous ways, including via the use of threads, snaps, or via other ways known to those skilled in the art. Those skilled in the art will also appreciate that a container can include containers made of different materials, including, but not limited to glass, plastic, steel, etc.

In some embodiments, the size of the pre-measured lid 101 apparatus can be modified so that it can be attached to containers of different sizes. For example, the size of the pre-measured lid 101 apparatus can be modified so that it can be attached to a flour container measuring 10 centimeters in diameter, or to a protein workout supplement container measuring 12 centimeters in diameter.

After the pre-measured lid 101 apparatus is attached to the container with the substance inside, the present technology can be used to transfer the substance from the container to the measuring cup 108 through the pre-measured lid 101. As described above, the bottom portion 105 can also have two rotation stops 106 that extend upwards from the bottom portion 105. The top portion 102 can also have a bumper 104 that extends downwards from the top portion 102 such that when the top portion 102 is rotating about the bottom portion 105, the top portion's 102 movement can be impeded by the bumper 104 from the top portion 102 interfacing with the rotation stops 106 from the bottom portion 105.

The bottom portion can contain an opening 107 that can be the same diameter as the threaded hole 103 from the top portion 102 that has the measuring cup 108 attached to the threaded hole 103. A user can rotate the top portion 102 with the measuring cup 108 attached about the bottom portion 105, such that the opening 107 from the bottom portion 105 can align with the threaded hole 103 of the top portion 102, which then the user can turn the container upside down. The user can visualize through the measuring cup 108 when it is full of the substance from the container. The user can then rotate the top portion 102 about the bottom portion 105 until the bumper 104 from the top portion 102 interfaces with one of the stops 106 and impedes the rotation of the top portion 102. At this time, the threaded hole 103 of the top portion 102 can be a sufficient distance from the opening 107 of the bottom portion 105 such that none of the substance from the container can enter the measuring cup 108, or exit the container.

With the measuring cup 108 full of the substance from the container that is still turned upside down, the user can unscrew the measuring cup 108 from the threaded hole 103 with their hand on the measuring cup, while holding the container with their other hand. The user now has a measuring cup 108 full of the substance from the container that is of an amount equal to the volume of the measuring cup 108. The container can be temporarily sealed off until either the pre-measured lid 101 apparatus is removed from the container, or the top portion 102 is rotated about the bottom portion 105 such that the opening 107 of the bottom portion 105 aligns with the threaded hole 103 of the top portion 102.

Figure 2:
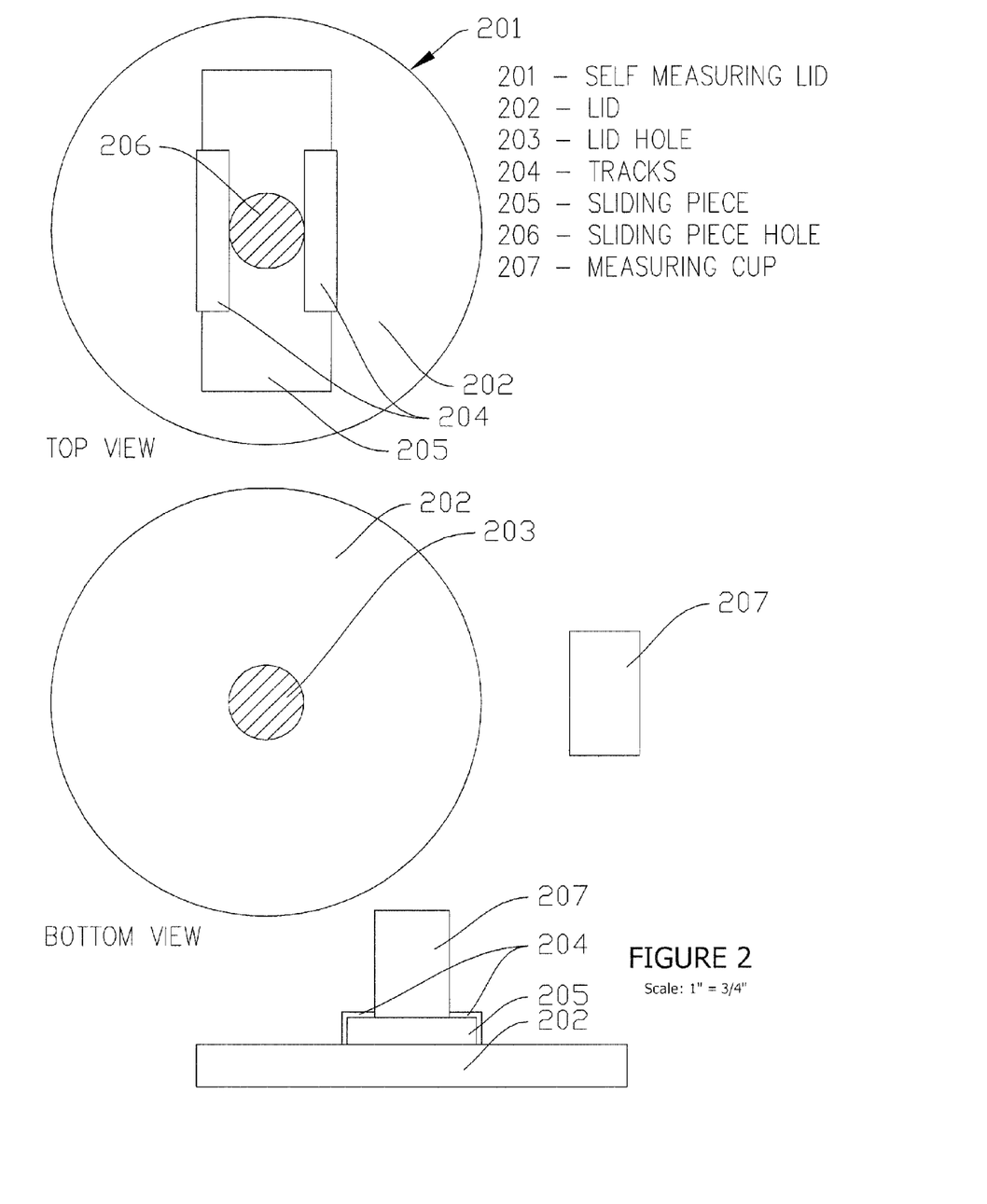
FIG. 2 illustrates an embodiment of the pre-measured dispensing lid.

FIG. 2 illustrates the components of another embodiment of the apparatus. In this embodiment, the apparatus can also include a pre-measured lid 201. The pre-measured lid 201 can include a lid 202, a lid hole 203, tracks 204, a sliding portion 205, a sliding portion hole 206, and a measuring cup 207. The pre-measured lid 201 can then be attached to a container that contains a substance.

The lid 202 can be 12 inches in diameter and composed of plastic. The lid 202 can also be 1 inch in thickness. Those skilled in the art will appreciate that the lid 202 can be 6 inches, 10 inches, or any other diameter. Those skilled in the art will also appreciate that the lid 202 can be 2 inches, 3 inches, etc. in thickness. Those skilled in the art can further appreciate that the lid 202 can be composed of wood, iron, alloy metal, or other substances suitable for use in the present technology.

The lid 202 can have a hole in the center of the lid 202 called a lid hole 203. The lid hole 203 can be 1 inch in diameter. Those skilled in the art can appreciate that the lid hole 203 can be 2 inches, 3 inches, etc. in diameter, as long as the diameter of the lid hole 203 is less than the diameter of the lid 202. On the top side of the lid 202, there can be two tracks 204. The tracks 204 can be placed parallel to each other on opposite sides of the lid hole 203. The tracks 204 can be attached to the lid 202 via the use of an adhesive. Those skilled in the art can recognize that the tracks 204 can be attached to the lid in other ways, such as glue, double-sided tape, etc. In another embodiment of the present technology, the tracks 204 can be molded as part of the lid 202 such that the use of an adhesive is not necessary. The tracks 204 can be 2 centimeters in height and made of plastic, and 4 inches in length. Those skilled in the art can appreciate that the two tracks can be 1 inch, 3 inches, etc. in height and can be 1 inch, 3 inches, etc. in length and composed of other materials besides plastic such as wood, metal, etc. that are suitable for use in the present technology. The two tracks 204, as illustrated in FIG. 2, can be L-Shaped. The L-Shaped tracks 204 can be used to guide the sliding portion 205 back and forth over the lid hole 203 on the lid 202.

The sliding portion 205 can be placed between the two tracks 204. The sliding portion 205 can be made of plastic, or of other materials such as wood, metal, etc. that are suitable for use in the present technology. In the middle of the sliding portion 205 can be a sliding portion hole 206 that can be threaded to allow for a user to screw a measuring cup 207 with a threaded top into the sliding portion hole 206. The sliding portion hole 206 can be the same diameter as that of the lid hole 203. The sliding portion hole 206 can be a diameter less than the diameter of the lid hole 203, depending of the substance located in the container that will be transferred to the measuring cup 207.

A measuring cup 207 can be attached to the sliding portion hole 206 on the sliding portion 205. A measuring cup 207 can be attached to the sliding portion hole 206 via threads on the top of the measuring cup 207, as described above. Those skilled in the art can appreciate that the measuring cup 207 can be attached to the sliding portion hole 206 via snaps, or via other mechanisms known in the art. The sliding portion 205, with the measuring cup 207 attached, can be placed between the tracks 204. A user can move the sliding portion 205 with the measuring cup 207 attached over the lid hole 203 on the lid 202.

A lid 202, lid hole 203, tracks 204, sliding portion 205, sliding portion hole 206, and measuring cup 207 can comprise the components of a pre-measured lid 201. The pre-measured lid can then be attached to a container that contains a substance. The substance can include flour, sugar, tea, weight lifting protein, or various other substances that go into the container. The pre-measured lid 201 apparatus can be attached to a container in numerous ways, including via the use of threads, snaps, or via other ways known to those skilled in the art. Those skilled in the art will also appreciate that a container can be made of different materials including, but not limited to glass, plastic, steel, etc.

In one embodiment of the present technology, the size of the pre-measured lid 201 apparatus can be modified so that it can be attached to containers of different sizes. For example, the size of the pre-measured lid 201 apparatus can be modified so that it can be attached to a flour container measuring 10 centimeters in diameter, or to a protein workout supplement container measuring 12 centimeters in diameter.

After the pre-measured lid 201 apparatus is attached to the container with the substance inside, the present technology can be used to transfer the substance from the container to the measuring cup 207 through the pre-measured lid 201. A user can align the sliding portion hole 206 with the measuring cup 207 attached by pushing the sliding portion 205 over the tracks until the sliding portion hole 206 is aligned with the lid hole 203. A user can turn the container upside down, which then the substance from the container can then enter the measuring cup 207 through the lid hole 203 and the sliding portion hole 206. After the measuring cup 207 is full of the substance from the container, the user can push the sliding portion 205 along the tracks 204 to a point where the sliding portion hole 206 is no longer over the lid hole 203. The user can then unscrew the measuring cup 207 from the sliding portion 205 with the substance inside the measuring cup 207 and then turn the container to an upright position. The container can be temporarily sealed off until either the pre-measured lid 201 apparatus is removed from the container, or the sliding portion 205 is moved along the tracks 204 so that the sliding portion hole 206 aligns with the lid hole 203.

Figure 3:
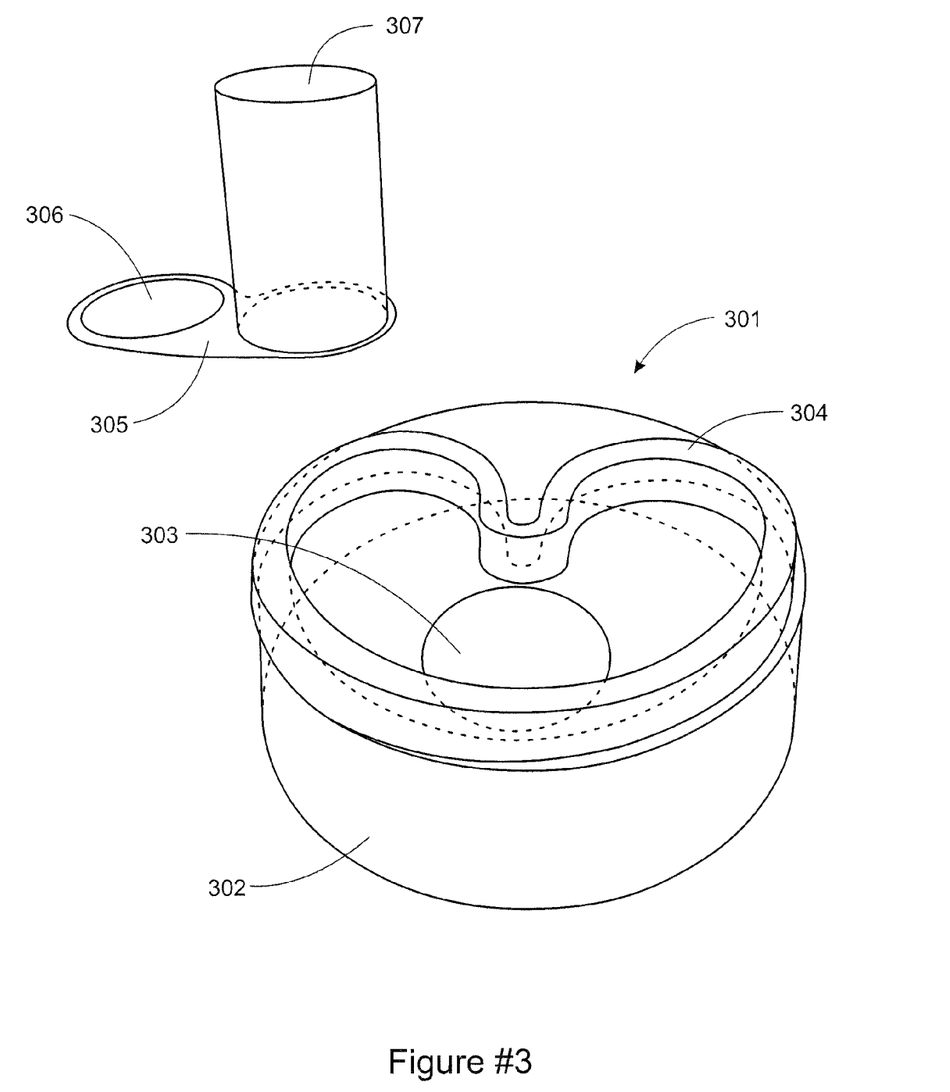
FIG. 3 illustrates an embodiment of the pre-measured dispensing lid.

FIG. 3 illustrates the components of another embodiment of the apparatus. The apparatus can again include a pre-measured lid 301. The pre-measured lid can include a lid 302, a lid hole 303, a track 304, a sliding portion 305, a sliding portion hole 306, and a measuring cup 307. The pre-measured lid can then be attached to a container that contains a substance.

The lid 302 can be 12 inches in diameter and composed of plastic and can also be 1 inch in thickness. Those skilled in the art will appreciate that the lid 302 can be 6 inches, 10 inches, or any other diameter length. Those skilled in the art will also appreciate that the lid 302 can be 2 inches, 3 inches, etc. in thickness. Those skilled in the art can further appreciate that the lid 302 can be composed of wood, iron, alloy metal, or other substances suitable for use in the present technology.

The lid 302 can have a hole in the center of the lid 302 called a lid hole 303. The lid hole 303 can be 1 inch in diameter. Those skilled in the art can appreciate that the lid hole 303 can be 2 inches, 3 inches, etc. in diameter, as long as the diameter of the lid hole 303 is less than the diameter of the lid 302.

Figure 4:
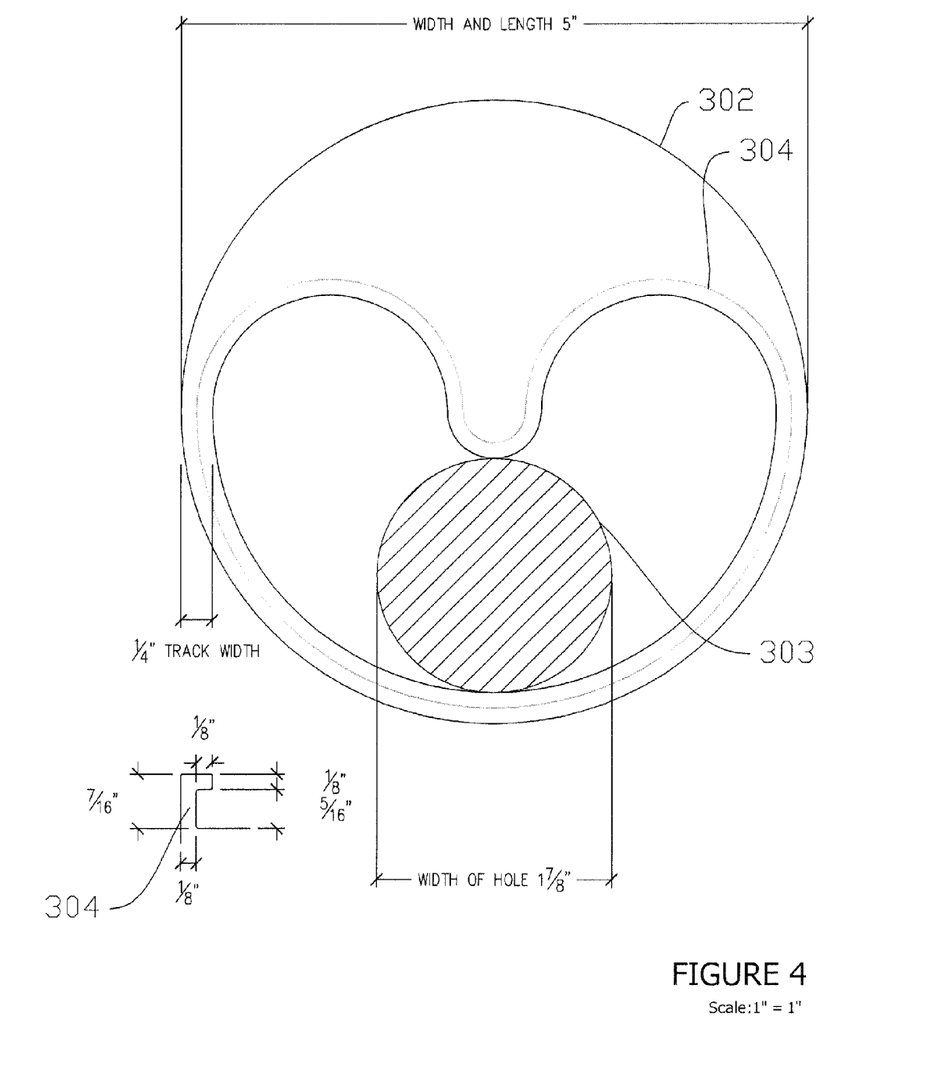
FIG. 4 illustrates a top view of the embodiment shown in FIG. 3.

On the top side of the lid 302 there can be a track 304. The track 304 can assist the sliding portion 305 to move in the proper direction as it moves within the track 304. The track 304 can be ¼ of an inch wide and ⅛ of an inch in height and composed of plastic. Those skilled in the art can appreciate that the track 304 can be other widths and heights and composed of other materials such as wood, metal, etc. The track 304 can be attached to the lid 302 with an adhesive such as glue. Those skilled in the art can appreciate that the track 304 can be attached to the lid with other adhesive materials known to those skilled in the art. In another embodiment of the present technology, the track 304 can be molded as part of the lid 302 such that the use of an adhesive is not necessary. The track 304 can be located on the top side of the lid 302 as illustrated in FIG. 3. Those skilled in the art can appreciate that the track 304 can be located on the top of the lid in other locations, as long as the track 304 allows for a sliding portion 305 to move within the track 304 and pass over the lid hole 303. FIG. 4 illustrates a top-down view of the track 304 in an embodiment of the present technology.

A sliding portion 305 can fit within the track 304 and snap in to the track 304 so that it can move within the track and not fall out if turned upside down. The sliding portion 305 can be of the shape illustrated in FIG. 4. Those skilled in the art can appreciate that the sliding portion can be other shapes, as long as the sliding portion 305 can fit within the tracks and pass over the lid hole 303. The sliding portion 305 can be composed of plastic, or of other materials known to those skilled in the art such as metal, wood, etc.

Figure 5:
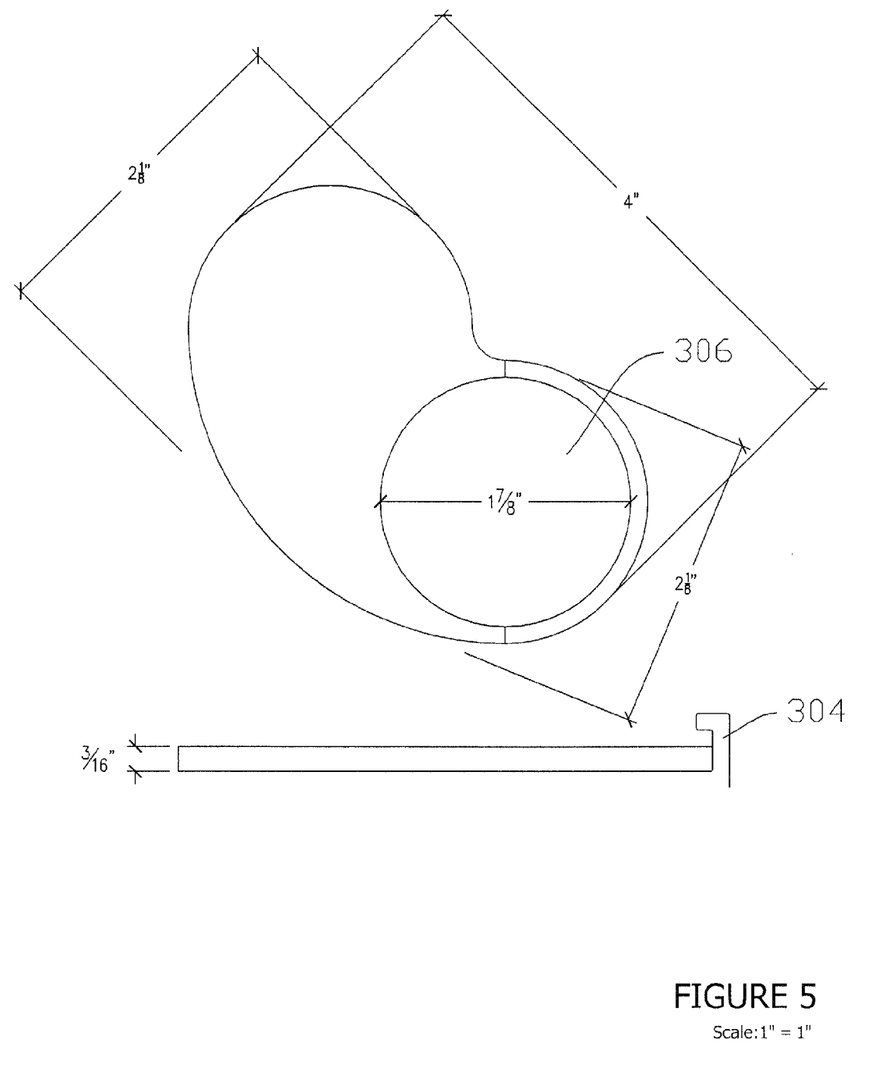
FIG. 5 illustrates a view of one of the components of the embodiment shown in FIG. 3.

FIG. 5 illustrates a top-down view of the sliding portion in an embodiment of the present technology. On one side of the sliding portion 305 can be a sliding portion hole 306. The sliding portion hole 306 can be the same diameter as the lid hole 303. In other embodiments, the sliding portion hole 306 can be a diameter less than the diameter of the lid hole 303. The sliding portion hole 306 can be threaded. A measuring cup 307 with a threaded top can then be screwed on by a user into the sliding portion hole 306 on the sliding portion 305. The other side of the sliding portion 305 will not have a hole. The sliding portion 305 with the measuring cup 307 attached to the sliding portion hole 306 can then be placed within the track 304 on the top of the lid 302. A user can then move the sliding portion 305 within the track 304 about the top of the lid 302. The sliding portion hole 306 on the sliding portion 305 can align with the lid hole 303. The user can also move the sliding portion 305 about the track so that the sliding portion 305 can cover the lid hole 303.

A lid 302, lid hole 303, tracks 304, sliding portion 305, sliding portion hole 306, and measuring cup 307 can comprise the components of a pre-measured lid 301. The pre-measured lid can then be attached to a container that contains a substance. The substance can include flour, sugar, tea, weight lifting protein, or various other substances that go in containers. The pre-measured lid 301 apparatus can be attached to a container in numerous ways, including via the use of threads, snaps, or via other ways known to those skilled in the art. Those skilled in the art will also appreciate that a container can include containers made of different materials, including, but not limited to glass, plastic, steel, etc.

A user can align the sliding portion hole 306 with the measuring cup 307 attached by moving the sliding portion 305 within the track 304 until the sliding portion hole 306 is aligned with the lid hole 303, and then turn the container upside down. The substance from the container can then enter the measuring cup 307 through the lid hole 303 and the sliding portion hole 306. After the measuring cup 307 is full of the substance from the container, the user can push the sliding portion 305 within the tracks 304 to a point where the sliding portion hole 306 is no longer over the lid hole 303. The user can then unscrew the measuring cup 307 from the sliding portion 305 with the substance inside the measuring cup 307. The user can then turn the container to an upright position. The container can be temporarily sealed off until either the pre-measured lid 301 apparatus is removed from the container, or the sliding portion 305 is moved along the tracks 304 so that the sliding portion hole 306 aligns with the lid hole 303.

FIG. 4 illustrates a view of one of the components of the apparatus. FIG. 4 illustrates a top-down view of the track 304 in an embodiment of the present technology. As illustrated in FIG. 4, the track 304 can be attached to the top of the lid 302. As an example, the lid 302 can be 5 inches in diameter. The lid hole 303 can be 1⅞ inches in diameter. The width of the track can be ¼ inches wide and L-Shaped to allow for the sliding portion 305 to snap in to the track 304. The track 304 can be located on the lid 302 to allow for a sliding portion 305 to move within the track 304 so that the sliding portion hole 306 on the sliding portion 305 can align with the lid hole 303.

FIG. 5 illustrates a view of one of the components of the apparatus. FIG. 5 illustrates a top-down view of the sliding portion 305 in an embodiment of the present technology. As illustrated in FIG. 5, the sliding portion can have two sides, one side containing a sliding portion hole 306 and the other side can be composed of plastic. The sliding portion hole 306 can be threaded to allow for the measuring cup 307 to screw in to the sliding portion hole 306. In an embodiment, the diameter of the sliding portion hole 306 is equal to the diameter of the threaded side of the measuring cup 307. The sliding portion can be placed within the track 304 on the top of the lid 302. When the sliding portion hole 306 on the sliding portion 305 is aligned with the lid hole 302, the pre-measured lid 301 apparatus can be turned upside down, and the substance contained within the container can be transferred to the measuring cup 307 on the sliding portion 305. After the measuring cup 307 is full of the substance, a user can move the sliding portion 305 within the track to a point where the sliding portion hole 306 and lid hole 302 are not aligned. A user can then unscrew the measuring cup 307 from the sliding portion 305. None of the substance from the container can exit the container, as the other side of the sliding portion 305 composed of plastic can keep the substance inside of the container.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

The invention claimed is:

1. A lid for a container comprising:
a measuring cup;
a top portion having a thickness and defining a first opening, the first opening including an attachment mechanism occupying the thickness of the top portion and being configured to receive the measuring cup within the first opening, the measuring cup configured to be removably attachable to the top portion within the first opening by engagement of the attachment mechanism;
a bottom portion having a first side and a second side, the bottom portion defining a second opening, the bottom portion being affixed to the top portion on the first side and the container on the second side, the bottom portion being stationary with respect to the top portion, the top portion being configured to be rotatable with respect to the bottom portion, whereby the first opening in the top portion can be aligned with the second opening in the bottom portion, whereby the contents of the container can be dispensed directly into the measuring cup when the measuring cup is received in the first opening and the first opening is substantially aligned with the second opening; and
wherein the top portion includes a bumper extended downwards to the bottom portion, and the bottom portion includes at least one rotation stop, the bumper and the at least one rotation stop being configured so that the bumper will interface with the at least one rotation stop to limit rotation of the top portion about the bottom portion.

2. The lid for a container of claim 1 further comprising:
a connector configured to affix the top portion to the bottom portion in a rotational relationship, whereby the top portion can rotate about the connector to bring the first opening into substantial alignment with the second opening.

3. The lid for a container of claim 1, wherein the attachment mechanism includes threads, and the measuring cup has complementary threads to the first opening; whereby the measuring cup is received by the first opening though the engagement of the threads of the measuring cup and the first opening.

4. The lid for a container of claim 1, wherein the top portion is configured to reversibly slide the first opening into alignment with the second opening.

5. The lid for a container of claim 1, wherein the attachment mechanism includes a snap.

6. The lid for the container of claim 1, wherein the bottom portion is affixed to the top portion in a manner in which the contents of the container can only be dispensed into the measuring cup when the first opening is at least partially aligned with the second opening.

7. The lid for the container of claim 1, wherein the first opening and the second opening are similar in size and the same shape with respect to each other.

8. The lid for the container of claim 1, wherein when the bumper of the top portion interfaces with the at least one rotation stop the first opening and the second opening are substantially aligned.

9. A method for dispensing a measured amount of a substance from a container comprising:
coupling a measuring cup in a reversible fashion to a top portion of a lid for the container using an attachment mechanism occupying a thickness of the lid, the top portion being affixed to a bottom portion of the lid, and the bottom portion being attached to the container;
aligning the measuring cup that is within the opening in the top portion of the lid with an opening in the bottom portion of the lid by rotating the measuring cup and top portion of the lid with respect to the bottom portion, thereby bringing the measuring cup and opening in the top portion of the lid into alignment with the opening in the bottom portion of the lid, wherein the rotation of the top portion is limited by a bumper and at least one rotation stop, the bumper being extended downwards from the top portion;
inverting the container, whereby an amount of substance fills the measuring cup whereby the contents of the container can be dispensed directly into the measuring cup when the measuring cup is received in the opening in the top portion of the lid and the opening in the top portion of the lid is substantially aligned with the opening in the bottom portion of the lid;
blocking the opening in the lid; and
detaching the measuring cup containing the substance from the opening while the container is inverted.

10. The method of claim 9, wherein the measuring cup is coupled to the lid by insertion into a track in the lid configured to allow the measuring cup to slide within the track.

11. The method of claim 9, wherein the blocking the opening in the lid is accomplished by misaligning the measuring cup with the opening in the lid.

12. The method of claim 9, wherein the blocking the opening in the lid is accomplished by rotating the top portion of the lid relative to the bottom portion of the lid until the measuring cup is misaligned with the opening in the bottom portion of the lid.

\* \* \* \* \*